United States Patent
Satish et al.

(10) Patent No.: US 8,499,063 B1
(45) Date of Patent: Jul. 30, 2013

(54) UNINSTALL AND SYSTEM PERFORMANCE BASED SOFTWARE APPLICATION REPUTATION

(75) Inventors: Sourabh Satish, Fremont, CA (US); William E. Sobel, Stevenson Ranch, CA (US)

(73) Assignee: Symantec Corporation, Mountain View, CA (US)

(*) Notice: Subject to any disclaimer, the term of this patent is extended or adjusted under 35 U.S.C. 154(b) by 703 days.

(21) Appl. No.: 12/059,258

(22) Filed: Mar. 31, 2008

(51) Int. Cl.
   *G06F 15/173* (2006.01)

(52) U.S. Cl.
   USPC ........... 709/223; 709/220; 709/224; 709/221; 726/22; 726/25; 717/168; 717/171; 717/174

(58) Field of Classification Search
   USPC ................................................. 709/223–226
   See application file for complete search history.

(56) References Cited

U.S. PATENT DOCUMENTS

| | | |
|---|---|---|
| 7,197,539 B1 | 3/2007 | Cooley |
| 7,412,516 B1 | 8/2008 | Brown et al. |
| 7,472,420 B1 | 12/2008 | Pavlyushchik |
| 7,546,349 B1 | 6/2009 | Cooley |
| 7,562,304 B2 | 7/2009 | Dixon et al. |
| 7,587,367 B2 | 9/2009 | Mengerink |
| 7,668,951 B2 | 2/2010 | Lund et al. |
| 7,783,741 B2 | 8/2010 | Hardt |
| 7,870,608 B2 | 1/2011 | Shraim et al. |
| 8,001,606 B1 | 8/2011 | Spertus |
| 8,019,689 B1 | 9/2011 | Nachenberg |
| 8,200,587 B2 | 6/2012 | Deyo |
| 8,250,657 B1 | 8/2012 | Nachenberg et al. |
| 8,312,536 B2 | 11/2012 | Nachenberg et al. |
| 8,341,745 B1 | 12/2012 | Chau et al. |
| 8,381,289 B1 | 2/2013 | Pereira et al. |
| 8,413,251 B1 | 4/2013 | Gibney et al. |
| 2002/0046041 A1 | 4/2002 | Lang |
| 2003/0167308 A1 | 9/2003 | Schran |
| 2004/0054661 A1 | 3/2004 | Cheung et al. |
| 2005/0050335 A1 | 3/2005 | Liang et al. |
| 2005/0268090 A1 | 12/2005 | Saw et al. |
| 2005/0283837 A1 | 12/2005 | Olivier |
| 2006/0026123 A1 | 2/2006 | Moore et al. |
| 2006/0085328 A1 | 4/2006 | Cohen et al. |
| 2006/0212270 A1 | 9/2006 | Shiu et al. |
| 2006/0212925 A1 | 9/2006 | Shull et al. |
| 2006/0212930 A1* | 9/2006 | Shull et al. .................... 726/10 |
| 2006/0212931 A1 | 9/2006 | Shull et al. |
| 2006/0230039 A1 | 10/2006 | Shull et al. |
| 2006/0253458 A1 | 11/2006 | Dixon et al. |

(Continued)

OTHER PUBLICATIONS

International Search Report and Written Opinion, PCT Application No. PCT/US09/48328, Dec. 22, 2010, 8 pages.

(Continued)

*Primary Examiner* — Ian N Moore
*Assistant Examiner* — Jackie Zuniga
(74) *Attorney, Agent, or Firm* — Fenwick & West LLP

(57) ABSTRACT

Installation events associated with a software application are received from a plurality of clients. A rate at which the software application was uninstalled on the plurality of clients is determined based on the installation events. A reputation score is generated based on the rate at which the software application was uninstalled on the plurality of clients. A reputation score is generated for the software application responsive to the installation event and the performance data. The reputation score storied in association with the software application.

16 Claims, 6 Drawing Sheets

U.S. PATENT DOCUMENTS

| | | | |
|---|---|---|---|
| 2006/0253581 A1 | 11/2006 | Dixon et al. | |
| 2006/0253583 A1 | 11/2006 | Dixon et al. | |
| 2006/0253584 A1 | 11/2006 | Dixon et al. | |
| 2007/0011739 A1 | 1/2007 | Zamir et al. | |
| 2007/0016953 A1 | 1/2007 | Morris et al. | |
| 2007/0050444 A1 | 3/2007 | Costea et al. | |
| 2007/0067843 A1 | 3/2007 | Williamson et al. | |
| 2007/0094734 A1 | 4/2007 | Mangione-Smith et al. | |
| 2007/0107053 A1 | 5/2007 | Shraim et al. | |
| 2007/0124579 A1 | 5/2007 | Haller | |
| 2007/0143629 A1 | 6/2007 | Hardjono et al. | |
| 2007/0156886 A1 | 7/2007 | Srivastava | |
| 2007/0162349 A1 | 7/2007 | Silver | |
| 2007/0192855 A1 | 8/2007 | Hulten et al. | |
| 2007/0233782 A1* | 10/2007 | Tali | 709/203 |
| 2008/0005223 A1 | 1/2008 | Flake et al. | |
| 2008/0028463 A1 | 1/2008 | Dagon et al. | |
| 2008/0077994 A1 | 3/2008 | Comlekoglu | |
| 2008/0082628 A1 | 4/2008 | Rowstron et al. | |
| 2008/0082662 A1 | 4/2008 | Dandliker et al. | |
| 2008/0104180 A1 | 5/2008 | Gabe | |
| 2008/0109244 A1 | 5/2008 | Gupta | |
| 2008/0109473 A1 | 5/2008 | Dixon et al. | |
| 2008/0109491 A1 | 5/2008 | Gupta | |
| 2008/0114709 A1 | 5/2008 | Dixon et al. | |
| 2008/0133540 A1 | 6/2008 | Hubbard et al. | |
| 2008/0133972 A1* | 6/2008 | Verbowski et al. | 714/37 |
| 2008/0137864 A1 | 6/2008 | Jin et al. | |
| 2008/0140442 A1 | 6/2008 | Warner | |
| 2008/0140820 A1 | 6/2008 | Snyder et al. | |
| 2008/0141366 A1 | 6/2008 | Cross et al. | |
| 2008/0189788 A1* | 8/2008 | Bahl | 726/25 |
| 2008/0255977 A1 | 10/2008 | Altberg et al. | |
| 2008/0263677 A1 | 10/2008 | Kaditz et al. | |
| 2009/0125382 A1 | 5/2009 | Delepet | |
| 2009/0254993 A1* | 10/2009 | Leone | 726/25 |
| 2009/0282476 A1 | 11/2009 | Nachenberg et al. | |
| 2009/0328209 A1 | 12/2009 | Nachenberg | |
| 2010/0005291 A1 | 1/2010 | Hulten et al. | |
| 2010/0153354 A1 | 6/2010 | Buccella et al. | |
| 2011/0040825 A1 | 2/2011 | Ramzan et al. | |
| 2011/0055923 A1 | 3/2011 | Thomas | |
| 2011/0067101 A1 | 3/2011 | Seshadri et al. | |
| 2011/0225655 A1 | 9/2011 | Niemala et al. | |
| 2012/0278264 A1 | 11/2012 | Deyo | |

OTHER PUBLICATIONS

Brin, S. et al., "The Anatomy of a Large-Scale Hypertextual Web Search Engine," Computer Networks and ISDN Systems, 1998, pp. 107-117, vol. 30, No. 1-7.

Christodorescu, M. et al., "Semantics-Aware Malware Detection," In Proceedings of the 205 IEEE Symposium on Security and Privacy, IEEE Computer Society, 2005.

Gonzalez, J. et al., "Residual Splash for Optimally Parallelizing Belief Propagation," AISTATS, 2009, 8 pages.

Gyongyi, Z. et al., "Combating Web Spam with Trustrank," Proceedings of the Thirtieth International Conference on Very Large Data Bases, VLDB Endowment, 2004, pp. 576-587, vol. 30.

Idika, N. et al., "A Survey of Malware Detection Techniques," Technical Report, Department of Computer Science, Purdue University, 2007, 48 pages.

Kephart, J. et al., "Automatic Extraction of Computer Virus Signatures," 4th Virus Bulletin International Conference, 1994, pp. 178-184.

Kleinberg, J., "Authoritative Sources in a Hyperlinked Environment," Journal of the ACM (JACM), 1999, pp. 604-632, vol. 46, No. 5.

Kolter, J. et al., "Learning to Detect and Classify Malicious Executables in the Wild," The Journal of Machine Learning Research, 2006, p. 2721-2744, vol. 7.

McGlohon, M. et al., "SNARE: A Link Analytic System for Graph Labeling and Risk Detection," Proceedings of the 15th ACM SIGKDD International Conference on Knowledge Discovery and Data mining, ACM, 2009, pp. 1265-1274, New York, N.Y.

Neville, J. et al., "Using Relational Knowledge Discovery to Prevent Securities Fraud," Proceedings of the Eleventh ACM SIGKDD International Conference on Knowledge Discovery in Data Mining, ACM, 2005, p. 458.

Neville, J. et al., "Collective Classification with Relational Dependency Networks," Workshop on Multi-Relational Data Mining (MRDM-2003), 2003.

Pandit, S. et al., "NetProbe: A Fast and Scalable System for Fraud Detection in Online Auction Networks," WWW '07, Proceedings of the 16th International Conference on World Wide Web, ACM, 2007, pp. 201-210, New York, N.Y.

Pei, J. et al., "On Mining Cross-Graph Quasi-Cliques," Proceedings of the Eleventh ACM SIGKDD International Conference on Knowledge Discovery in Data Mining, ACM, 2005, 11 pages.

Schultz, M. et al., "Data Mining Methods for Detection of New Malicious Executables," IEEE Symposium on Security and Privacy, IEEE Computer Society, 2001, pp. 38-49.

Siddiqui, M. et al., "A Survey of Data Mining Techniques for Malware Detection Using File Features," ACM-SE 46: Proceedings of the 46th Annual Southeast Regional Conference on XX, ACM, 2008, pp. 509-510, New York, N.Y.

Symantec Internet Security Threat Report, 36 pages, [Online] [Retrieved on Aug. 8, 2010] Retrieved from the Internet<URL:http://eval.symantec.com/mktginfo/enterprise/white_papers/b-whitepaper_exec_summary_internet_security_threat_report_xiii_04_2008.en-us.pdf>.

Symantec Malware Definition, [Online] [Retrieved on Aug. 6, 2010] Retrieved from the Internet<URL:http://www.symantec.com/norton/security_response/malware.jsp>.

Symantec Norton Community Watch Privacy Policy, [Online] [Retrieved on Aug. 6, 2010] Retrieved from the Internet<URL:http://www.symantec.com/about/profile/policies/ncwprivacy.jsp>.

Symantec Unveils New Model of Consumer Protection Codenamed "Quorum", 3 pages, [Online] [Retrieved on Aug. 8, 2010] Retrieved from the Internet<URL:https://www.symantec.com/about/news/release/article.jsp?prid=20090706_02>.

Tesauro, G. et al., "Neural Networks for Computer Virus Recognition," IEEE Expert, 1996, pp. 5-6, vol. 11, No. 4.

Tong, H. et al., "Fast Best-Effort Pattern Matching in Large Attributed Graphs," Proceedings of the 13th ACM SIGKDD International Conference on Knowledge Discovery and Data Mining, ACM, 2007, 10 pages.

Wang, W. et al., "GraphMiner: A Structural Pattern-Mining System for Large Disk-Based Graph Databases and Its Applications," Proceedings of the 2005 ACM SIGMOD International Conference on Management of Data, ACM, 2005, pp. 879-881.

Weaver, N. et al., "A Taxonomy of Computer Worms," Proceedings of the 2003 ACM Workshop on Rapid Malcode, ACM, 2003, pp. 11-18, New York, N.Y.

Yan, X. et al., "gSpan: Graph-Based Substructure Pattern Mining," Proceedings of the 2002 IEEE International Conference on Data Mining (ICDM '02), 2002, 4 pages.

Yan, X. et al., "Mining Closed Relational Graphs with Connectivity Constraints," Proceedings of the Eleventh ACM SIGKDD International Conference on Knowledge Discovery in Data Mining, ACM, 2005, p. 333.

Yedidia, J. et al., "Understanding Belief Propagation and Its Generalizations," Exploring Artificial Intelligence in the New Millennium, 2003, pp. 236-239, vol. 8.

Zeng, Z. et al., "Coherent Closed Quasi-Clique Discovery from Large Dense Graph Databases," Proceedings of the 12th ACM SIGKDD International Conference on Knowledge Discovery and Data Mining, ACM, 2006, 6 pages.

Zhu, X., "Semi-Supervised Learning with Graphs," 2005, 174 pages.

"McAfee SiteAdvisor: What is SiteAdvisor Software?" McAfee®, 2009, [Online] [Retrieved on Jul. 23, 2009] Retrieved from the Internet<URL:http://www.siteadvisor.com/howitworks/index.html>.

"StopBadware.org—StopBadware.org Frequently Asked Questions," stopbadware.org, 2009, [Online] [Retrieved on Jul. 23, 2009] Retrieved from the Internet<URL:htto://www.stopbadware.org/home/faq>.

"TrustedSource®: the Next-Generation Reputation System White Paper," Secure Computing Corporation, Oct. 2006, 6 pages.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

Walsh, K., "Fighting PeertoPeer SPAM and Decoys with Object Reputation," ACM, Aug. 22-26, 2005, pp. 1-6.

Archive of "Abaca Products > Filtering Technology," www.abaca.com, [Online] [Archived by http://archive.org on Oct. 24, 2006; Retrieved on Apr. 11, 2013] Retrieved from the Internet<URL: http://web.archive.org/web/20061024023812/http://www.abaca.com/product_technology.html>.

Colvin, R., Program Manager, SmartScreen, "Stranger Danger"—Introducing SmartScreen® Application Reputation, Oct. 13, 2010, pp. 1-9, can be retrieved at <http://blogs.msdn.com/b/ie/archive/2010/10/13/stranger-danger-introducing-smartscreen-application-reputation.aspx>.

Trend Micro™, "Outthink the Threat," A Trend Micro eBook, 2008, pp. 1-17, can be retrieved at <http://uk.trendmicro.com/imperia/md/content/campaigns/thinkagain/thinkagain_ebook.pdf>.

U.S. Appl. No. 12/059,271, filed Mar. 31, 2008, Inventors Brian Hernacki et al.

U.S. Appl. No. 12/165,599, filed Jun. 30, 2008, Inventor Carey S. Nachenberg.

U.S. Appl. No. 12/242,634, filed Sep. 30, 2008, Inventors Josephine Gibney et al.

U.S. Appl. No. 12/407,772, filed Mar. 19, 2009, Inventors Carey S. Nachenberg et al.

U.S. Appl. No. 12/416,020, filed Mar. 31, 2009, Inventors Shane Pereira et al.

U.S. Appl. No. 12/831,004, filed Jul. 6, 2010, Inventors Carey S. Nachenberg et al.

U.S. Appl. No. 13/556,401, filed Jul. 24, 2012, Inventors Carey S. Nachenberg et al.

U.S. Appl. No. 13/677,914, filed Nov. 15, 2012, Inventors Duen Hong Chau et al.

U.S. Appl. No. 13/666,788, filed Nov. 1, 2012, Inventors Carey S. Nachenberg et al.

U.S. Appl. No. 13/558,177, filed Jul. 25, 2012, Inventors Scott Schneider et al.

* cited by examiner

UNINSTALL AND SYSTEM PERFORMANCE BASED SOFTWARE APPLICATION REPUTATION

BACKGROUND OF THE INVENTION

1. Field of the Invention

This invention pertains in general to computer security and in particular to assessing the reputation of software applications.

2. Description of the Related Art

Software applications that are downloaded and installed on a user system can compromise the user's system in a number of ways. For instance, downloaded software applications can either contain malicious software (malware) or vulnerabilities to malware attacks. Common malware threats include computer viruses, worms, Trojan horse programs, spyware, adware, crimeware, and phishing websites. Other software applications may compromise the user's system by degrading the performance of the user's system.

Usually the user who downloads and installs the software application has some idea of the reputation or trustworthiness of the software application. The reputation of the software application provides the user with some level of certainty that the software application will not compromise the user's system. For example, if the software application is developed by a well known or reputable manufacturer, the user has a greater level of trust that the software application will not compromise their system. However, in some instances these factors are unknown or uncertain and cannot be accurately evaluated. Accordingly, there is a need in the art for improved ways to evaluate the reputation of a software application in order to provide an accurate reputation score that allows a user to assess whether or not to install the software application.

BRIEF SUMMARY

The above and other needs are met by systems, methods, and computer program products for generating a reputation score for a software application.

One aspect provides a computer-implemented method for generating a reputation score for a software application. Installation events associated with a software application from a plurality of clients and received. A rate at which the software application was uninstalled on the plurality of clients responsive to the installation events is determined. A reputation score is generated based on the rate at which the software application was uninstalled on the plurality of clients and stored in association with the software application.

In another aspect, the described embodiments provide a computer system for generating a reputation score for a software application. The system comprises a reputation reporting module adapted to receive installation events associated with a software application from a plurality of clients. The reputation reporting module is further adapted to determine a rate at which the software application was uninstalled on the plurality of clients responsive to the installation events. The system comprises a reputation scoring module adapted to generate a reputation score for the software application based on the rate at which the software application was uninstalled on the plurality of clients. The system further comprises a reputation score database adapted to store the reputation score in association with the software application.

Another aspect is embodied as a computer-readable storage medium encoded with computer program code for generating a reputation score for a software application according to the above described method.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
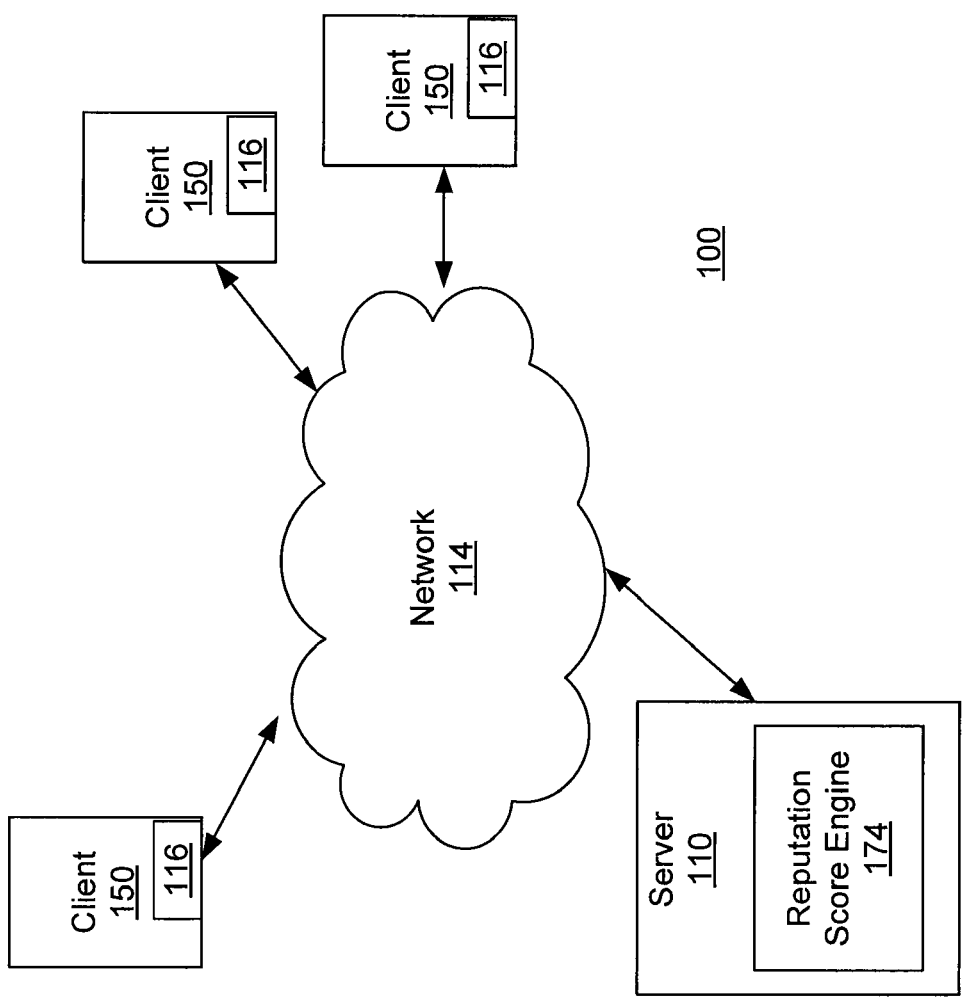
FIG. 1 is a high-level block diagram of a computing environment 100 according to one embodiment.

FIG. 1 is a high-level block diagram of a computing environment 100 according to one embodiment. FIG. 1 illustrates a reputation server 110 and three clients 150 connected by a network 114. Only three clients 150 are shown in FIG. 1 in order to simplify and clarify the description. Embodiments of the computing environment 100 can have thousands or millions of clients 150 connected to the network 114.

The reputation server 110 interacts with the clients 150 via the network 114. The reputation server 110 receives event data describing the state of each of the clients 150, including software applications present, downloaded, installed, uninstalled or executed on the clients. The reputation server 110 further receives system data describing the configuration of each of the clients 150, such as processor speed, software configuration data, and amount of memory on the clients 150. The reputation server further receives performance data including one or more performance metrics describing the performance of the client. According to the embodiment, the reputation server 110 may receive performance data describing real-time performance metrics or performance data describing average performance metrics generated over a specified time period (e.g. minutes, hours, or days).

In one embodiment, the reputation server 110 analyzes the data reported by the clients 150 and computes reputation scores for software applications. A reputation score is an assessment of the likelihood that a software application will compromise a user's computer. The software application may compromise a user's computer, for example, by degrading the performance of the user's computer, maliciously attacking the user's computer or causing the user's computer to be vulnerable to malware attacks. The reputation score may incorporate many indicators such as the likelihood that an entity is malicious (e.g., is a computer-related threat), the likelihood the software application will degrade system performance and the popularity of the software application. The reputation server 110 provides the reputation scores to the clients 150, and the clients 150 (and users of the clients) use the reputation scores to determine whether to perform certain activities such as installing software applications. For example, a client 150 can be configured to block downloading of software applications that have reputation scores below a threshold. Likewise, a user can decline to install or execute a software application upon viewing that software application's low reputation score.

In one embodiment, a client 150 is a computer used by one or more users to perform activities including downloading, installing, and/or executing software applications and browsing web sites on the network 114. The client 150, for example, can be a personal computer executing a web browser such as MICROSOFT INTERNET EXPLORER that allows the user to retrieve and display content from web servers and other computers on the network 114. In other embodiments, the client 150 is a network-capable device other than a computer, such as a personal digital assistant (PDA), a mobile telephone, a pager, a television "set-top box," etc. For purposes of this description, the term "client" also includes computers such as servers and gateways that encounter software applications. For example, a client 150 can be a network gateway located between an enterprise network and the Internet.

In one embodiment, the client 150 executes a health module 116 that monitors the performance of the client 150. The health module 116 further monitors event data related to software applications on the client 150 such as execution of software applications, installation of new software applications, requests to install software applications and un-installation of software applications. The health module 116 provides performance data describing the performance of the client 150 and event data related to software applications on the client 150 to the reputation server 110. The health module 116 further provides system data regarding the hardware components and software configuration of the client 150 to the reputation server 110.

In addition, the health module 116 receives reputation scores from the reputation server 110, evaluates and reports the reputation scores. In one embodiment, the health module 116 evaluates the reputation score for a software application by, for example, comparing it to a threshold or displaying a message based on it to the user. The health module 116 optionally cancels an activity or performs another operation involving the software application in response to a result of the evaluation. The health module 116 provides a description of the operation performed as a result of the evaluation to the reputation sever 110.

Thus, the reputation server 110 uses performance data, system data and event data from several clients 150 to generate an overall reputation score which is then used to provide reputation information to prospective users of the software application. This approach leverages the collective performance data and event data of many clients 150 to assign reputation scores to software applications that accurately measure the risks associated with the software applications. The reputation scores are computed without requiring the users to explicitly evaluate or judge the software applications. Thus, the approach is well-suited to computing environments where there are significant amounts of software applications with unknown reputation scores presented to the user for downloading.

The network 114 represents the communication pathways between the reputation server 110 and clients 150. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
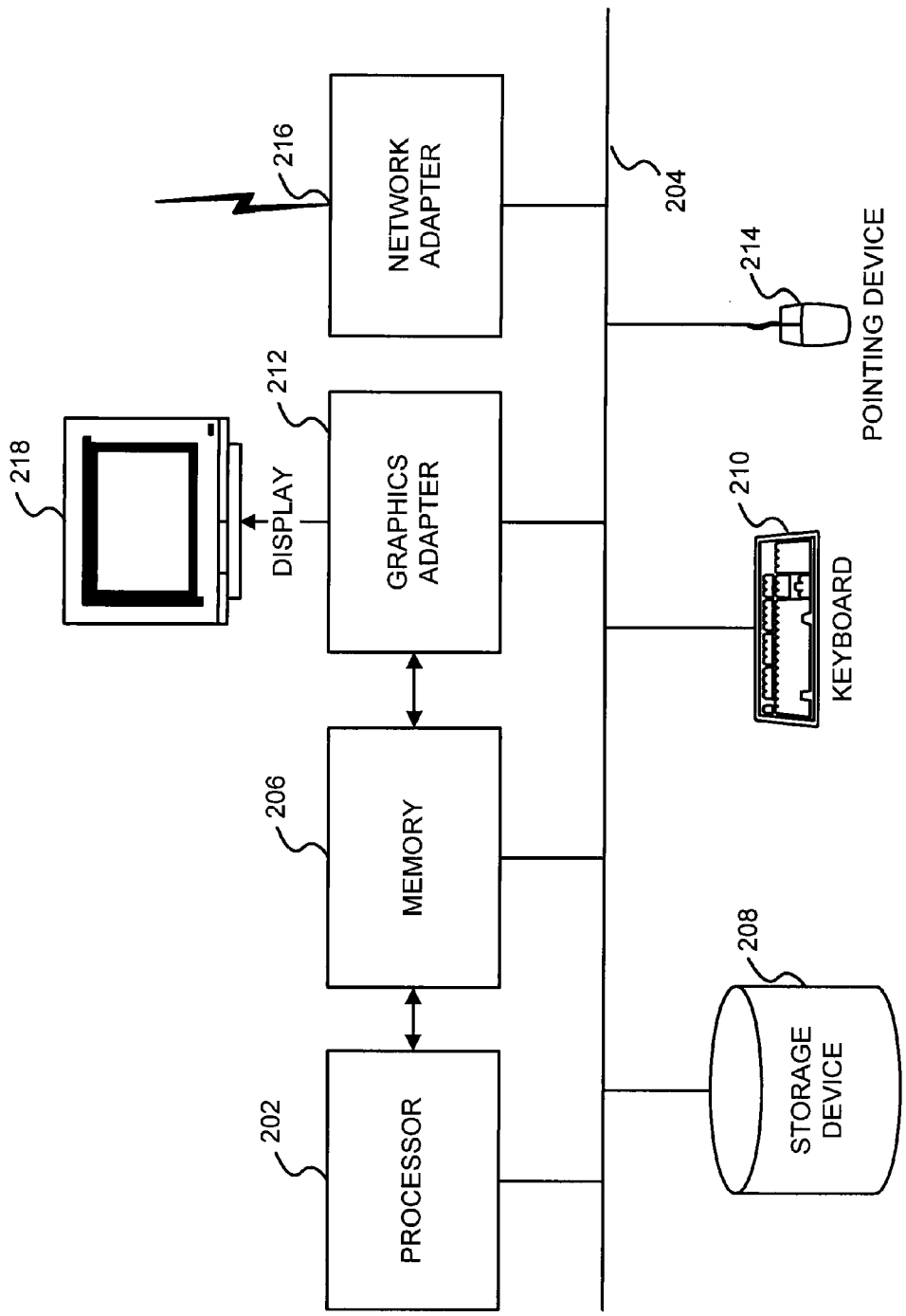
FIG. 2 is a high-level block diagram illustrating a typical computer for use as a reputation server 110 or client 150 according to one embodiment.

FIG. 2 is a high-level block diagram illustrating a typical computer 200 for use as a reputation server 110 or client 150. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computer systems 200 utilized by the entities of FIG. 1 can vary depending upon the embodiment and the processing power utilized by the entity. For example, a client 150 that is a mobile telephone typically has limited processing power, a small display 218, and might lack a pointing device 214. The reputation server 110, in contrast, may comprise multiple blade servers working together to provide the functionality described herein.

Figure 3:
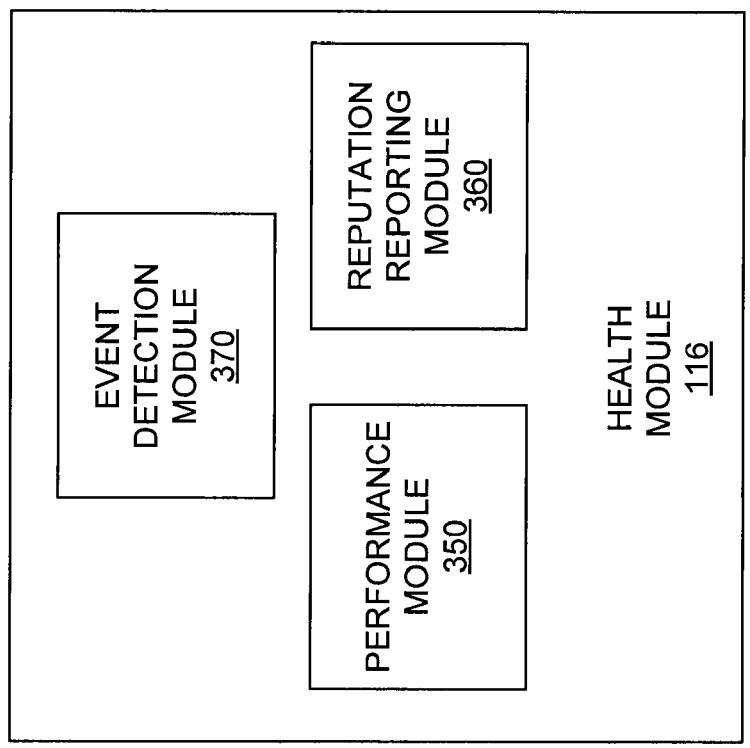
FIG. 3 is a high-level block diagram illustrating a detailed view of a health module 116 adapted to run on a client 150 according to one embodiment.

FIG. 3 is a high-level block diagram illustrating a detailed view of the health module 116 of a client 150 according to one embodiment. In some embodiments, the health module 116 is incorporated into an operating system executing on the client 150 while in other embodiments the health module 116 is a standalone application or part of another product. As shown in FIG. 3, the health module 116 includes multiple modules. Those of skill in the art will recognize that other embodiments of the health module 116 can have different and/or other modules than the ones described here, and that the functionalities can be distributed among the modules in a different manner.

A performance module 350 monitors system behavior and generates performance data describing performance metrics for the client 150 device. The performance module 350 generates performance metrics such as: latency metrics, throughput metrics, availability metrics and utilization metrics. Latency metrics evaluate a delay time between when an action is requested and performed on the client 150. Throughput metrics evaluate a number of actions on the client 150 per a unit of time, such as memory accesses per second. Availability metrics evaluate a fraction of time a component of the client 150 is available. Utilization metrics evaluate a fraction of time a component of the client 150 is utilized. According to the embodiment, the performance module 250 may generate performance data intermittently or continuously.

The performance module 350 further collects system data describing the hardware components of the client 150. System data may include information such as the processor speed, system memory and available memory of the client 150. System data may further include information regarding the configuration of hardware components on the client 150.

An event detection module 370 monitors the client 150 to detect events involving the client 150 and entities such as software applications. To this end, an embodiment of the event detection module 370 identifies software applications that are installed on the client's storage device 208 and software applications that are installed in the client's memory 206. In addition, the event detection module 370 monitors activities performed on the client 150 that are related to software applications, such as installation events. An "installation event", as referred to herein, describes any new event in which a software application is installed or uninstalled from a client computer system. In one embodiment, the types of monitoring performed by the event detection module 370 are limited based on user-configurable parameters. For example, the user can disable certain types of monitoring due to privacy or other types of concerns. In addition, an embodiment of the event detection module 370 can temporarily suspend an activity such as an installation event, in order to provide an opportunity to cancel it.

The performance module 350 and the event detection module 370 further communicate with the reputation server 110 via the network 114. The performance module 350 and event detection module 370 report performance data and event data to the reputation server 110. The performance module 350 works with the event detection module 370 to determine differences in performance data after an installation event for a software application. The performance module 350 and event detection module may report performance data and event data to the reputation server 110 at a scheduled time or whenever a change occurs such as a change in a performance data or the occurrence of an installation event. Some embodiments include a unique client identifier or other data in the reports to allow the reputation server 110 to associate particular reports with the clients 150 that generated them, and to detect duplicate reports.

A reputation reporting module 360 receives reputation scores for software applications from the reputation server 110 via the network 114. In one embodiment, the reputation reporting module 360 works with the event detection module 370 to detect when the client 150 attempts to install a software application having a reputation score. These attempts can include attempts to install a software application performed automatically without the user's knowledge and attempts to install a software application that occur at the user's direction. In one embodiment, the reputation reporting module 360 sends the identity of the software application (e.g., a hash of an executable file) to the reputation server 110 and receives a reputation score in return. In another embodiment, the reputation reporting module 360 maintains a cache of reputation scores for certain software applications, and consults the cache before (or instead of) contacting the reputation server 110 to determine whether the score is contained therein. Further, an embodiment of the reputation reporting module 360 maintains an exclusion set that identifies software applications or other entities the reputation reporting module 360 need not evaluate. These excluded entities are identified using digitally-signed hashes of the files and/or via other techniques.

In one embodiment, the event detection module 370 suspends the installation of the software application while the reputation reporting module 360 obtains the software application's reputation score. The reputation reporting module 360 evaluates the reputation score and, depending upon the score, cancels the suspended installation. In one embodiment, the reputation reporting module 360 evaluates the reputation score against a reputation threshold and cancels the installation if the score is below the threshold (and/or allows the activity if the score is above the threshold). For example, the reputation reporting module 360 can determine that the software application that the browser is attempting to install from a website has a reputation score below the threshold, and therefore cancel the installation. In one embodiment, the threshold is set by the user. In other embodiments, the threshold is set by an administrator of the client 150 or by the reputation server 110.

In one embodiment, the reputation reporting module 360 displays a message describing the reputation score to the user, and thereby provides the user with an opportunity to cancel the installation in response to the score. This display can occur if the reputation score is below the reputation threshold (or below a different threshold). For example, the reputation reporting module 360 can detect that a software application the user is attempting to install has a low reputation score, and display the reputation score or a warning message to the user to let the user evaluate the reputation.

In some embodiments, the reputation score displayed to the user is represented as a numeric value while in other embodiments it is represented using other techniques such as a textual description or graphical icon. For example, an embodiment of reputation reporting module 360 displays a reputation score for a software application in a dialog box or other user interface (UI) element presented on the client 150 display when the user attempts to install the software application. The display presented by the reputation reporting module 360 can include, for example, a dialog box with a message like "This program has a bad reputation. Are you sure you want to install it?," "Many people have uninstalled this program. Are you sure you want to install it?" or "This program has been tried by very few users and its reputation is unknown, would you like to test it?"

In one embodiment, the display presented by the reputation reporting module 360 provides the user with the opportunity to cancel the installation. Thus, the dialog box presented by the reputation reporting module 360 can include a set of "Yes/No" or "OK/Cancel" buttons that let the user cancel or confirm the installation of a software application. As mentioned above, an embodiment of the event detection module 370 monitors the user's response to the reputation score, specifically whether the user chooses to continue or cancel the activity in view of the reputation score. The event detection module 370 notifies the reputation server 110 of the user's response.

Figure 4:
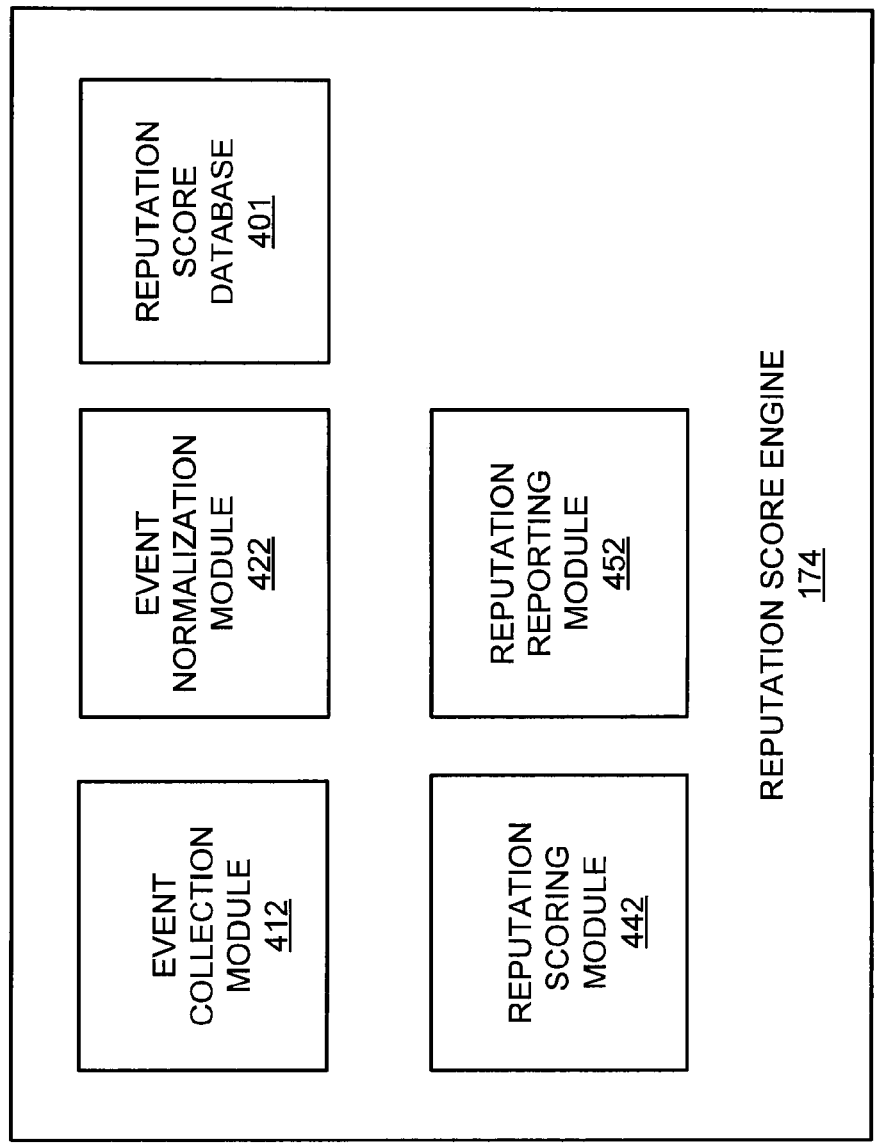
FIG. 4 is a high-level block diagram illustrating a detailed view of a reputation score engine 174 adapted to run on the reputation server 110 according to one embodiment.

FIG. 4 is a high-level block diagram illustrating a detailed view of the reputation score engine 174 according to one embodiment. As shown in FIG. 4, the reputation score engine 174 includes several modules. Those of skill in the art will recognize that other embodiments of the reputation score engine 174 can have different and/or other modules than the ones described here, and that the functionalities can be distributed among the modules in a different manner.

A reputation reporting module 452 communicates with the clients 150 via the network 114 to receive performance data, system data and event data. Further, an embodiment of the reputation reporting module 452 provides reputation scores for software applications to the clients 150.

An event collection module 412 analyzes performance data in conjunction with installation event data to determine residual performance deltas. A residual performance delta represents the difference in the performance data for a client 150 before the installation of software application and the performance data for the client 150 after the un-installation of a software application. The residual performance delta indicates the likelihood that the software application will compromise the client 150 by causing performance degradation that persists after the software application has been un-installed. In one embodiment, the event collection module 412 analyzes the performance data to determine residual performance deltas based on average performance data calculated for a defined period of time before the installation of the software application and a period of time after un-installation of the software application. According to the embodiment, the amount of performance data used to calculate residual performance deltas can range from performance data corresponding to one time point to performance data corresponding to many time points. For example, average performance data may be calculated based on all performance data for a client 150 before a software application is installed.

In other embodiments, residual performance deltas are determined based on best and/or worst performance data from the set of performance data before the installation and after un-installation of the software application on the client 150. For example, the residual performance delta may be determined based on a lowest number of transactions per minute before and after the installation event. The event collection module 412 further analyzes installation event data to determine the duration of time the software application was installed on the client 150.

An event normalization module 422 functions to normalize the residual performance deltas so that the residual performance deltas are comparable over different clients 150 with different system data. The event normalization module 422 receives the residual performance deltas determined by the event collection module 412. The event normalization module 412 normalizes the residual performance delta for a software application determined for each of the clients 150 based on system data for each client 150. For instance, the event normalization module 422 may normalize a latency metric based on the speed of the client's processor. The event normalization module 422 may use any type of normalization to account for differences in performance data based on system data for the client. Suitable types of normalization include linear normalization or regression based methods.

The reputation scoring module 442 generates the reputation score based on the rate of un-installation of the software application reported from the clients 150 and/or the duration of time the software application was installed in each client 150. The rate of un-installation of a software application indicates the likelihood that the software application will compromise a client 150 as a software application that has been uninstalled from a majority of the clients 150 is likely to be malware or cause performance degradation on a client 150. Likewise, the duration of time the software application was installed on each of the clients 150 indicates the likelihood that the software application will compromise a client 150 as software applications that are uninstalled shortly after installation are likely to have been removed because they are malware or cause performance degradation.

In one embodiment, the reputation score is inversely proportional to the rate of un-installation. In embodiments which use the duration of time the software application is installed on a client 150, the reputation score is proportional to the duration of time the software application is installed on the client 150.

In some embodiments, the reputation scoring module 442 further generates a reputation score for a software application based on the set of normalized residual performance deltas generated for the clients 150. The reputation scoring module 442 combines the set of normalized residual performance deltas to generate a reputation score for the software application. In one embodiment, the reputation scoring module 442 analyzes the normalized residual performance deltas to determine the standard deviation of the normalized residual performance deltas. The standard deviation is used to assess the variation in the normalized residual performance deltas. If the standard deviation of the normalized residual performance deltas is above a given threshold value indicating inconsistent results, then the reputation scoring module 442 does not generate a reputation score.

The reputation scoring module 422 may combine the normalized residual performance deltas in any way to generate a reputation score. The reputation scoring module 422 generates reputations scores that are inversely proportional to the magnitude of the combined normalized residual performance delta. For instance, if the combined normalized residual performance delta is negligible, the software application is given a high reputation score indicating that the software application has a minimal impact on system performance. Conversely, if the combined normalized residual performance delta has a large value indicating compromised system performance associated with the software application, then the software application will be given a low or negative reputation score.

The combined normalized residual performance delta, the rate of un-installation, and duration of time the software applications may be combined in any way to generate a reputation score. For instance, for an application that is frequently uninstalled after a short period of time, the rate of un-installation and duration of installation may be weighted heavier than the combined normalized residual performance deltas.

In some embodiments, the reputation score is weighted based on a confidence value associated with the normalized residual performance delta. The confidence value can be based on any value which indicates the reliability or consistency of the normalized residual performance deltas. For example, the confidence value may be based on the standard deviation of the normalized residual performance deltas, indicating the consistency of the normalized differences in performance data. The confidence value may also be based on the number of residual performance deltas, indicating the trustworthiness of the normalized residual performance deltas.

In some embodiments, the reputation scoring module 422 normalizes the generated reputation scores within a given range, such as zero and one, in order to allow direct comparisons across reputation scores of different software applications. For example, a score of zero can represent the lowest reputation while a score of one can represent the highest reputation. In other embodiments, the reputation score is quantized into one of a limited set of values.

The reputation score assigned to a software application can evolve over time. One embodiment initially assigns a previously-unknown software application a low reputation score. This initial low score represents a "probation period" where the entity is treated as unknown until it is encountered by enough clients 150 to assess its true reputation. Thus, the initial reputation score is likely to change as increasing number of clients 150 install the software application. A software application with an initially-low reputation score can receive a higher reputation score as it is installed by clients 150 and a minimal rate of un-installation is reported. An embodiment of the reputation scoring module 442 observes these sorts of activities and continually updates software applications' reputation scores in the reputation score database 401.

The reputation score database 401 stores reputation scores in association with a unique identifier for the software application (e.g. a hash of the software application). In some embodiments, the reputation score database 410 stores information used to generate the reputations scores such as the differences in system performance data coincident with installation events. The reputation score database 401 can, but does not necessarily, store the identities of the particular clients 150 that reported the differences in system performance data coincident with installation events.

Figure 5:
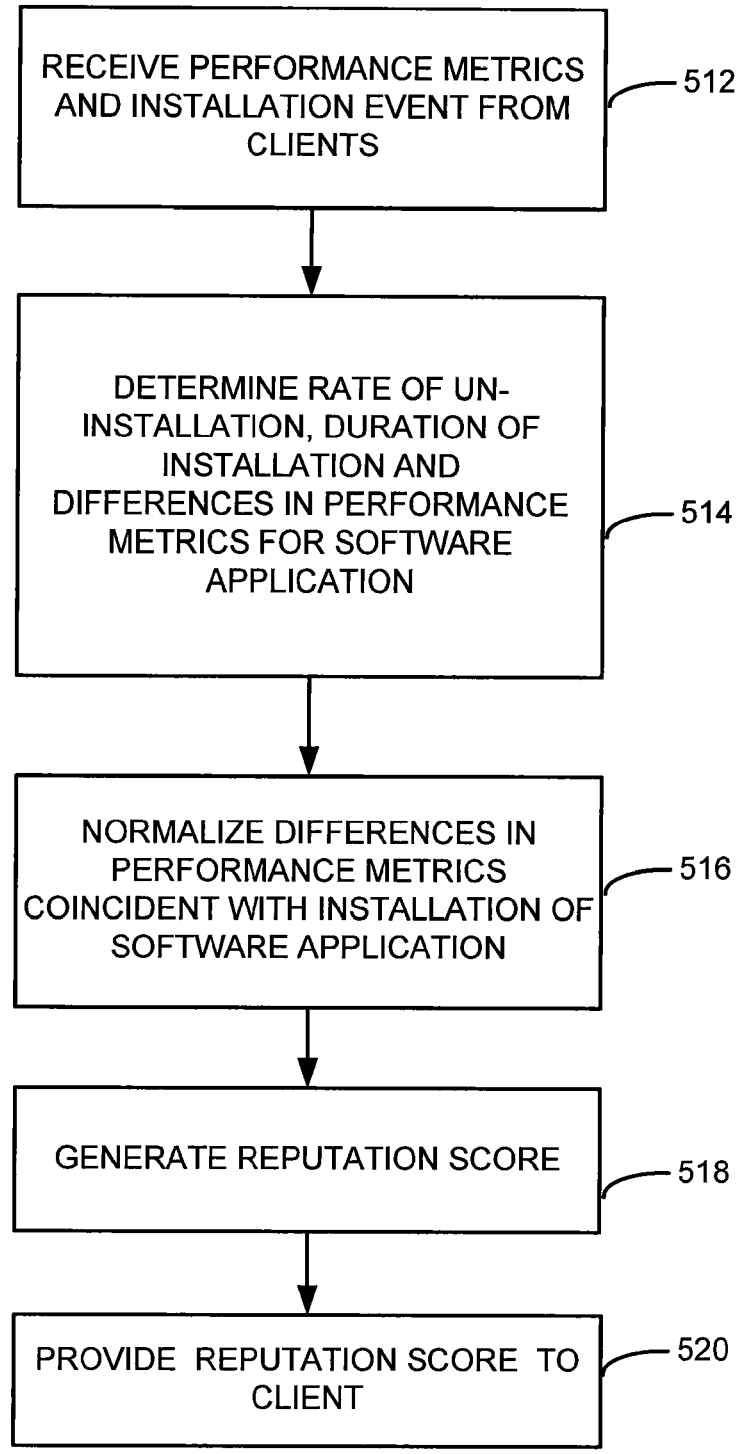
FIG. 5 is a flowchart illustrating steps performed by the reputation score engine 174 to provide a reputation score for a software application to a client according to one embodiment.

FIG. 5 is a flowchart illustrating steps performed by the reputation score engine 174 to provide reputation scores to a client 150 according to one embodiment. Other embodiments perform the illustrated steps in different orders, and/or perform different or additional steps. Moreover, some of the steps can be performed by engines or modules other than the reputation score engine 174.

The reputation reporting module 452 receives 512 performance data, event data and system data from the clients 150. The event collection determines a rate of un-installation of the software application on the clients 150 and the duration of time the software application is installed on the clients 150. The event collection module 412 also determines 514 differences in performance data reported by the clients 150 before and after the installation and un-installation of a software application. The event normalization module 422 normalizes 516 the differences in performance data for the software application based on system data for the clients 150. The reputation scoring module 442 generates 518 a reputation score based on the rate of un-installation of the software application on the clients 150, the duration of time the software application is installed on the clients 150 and the normalized differences in performance data. The reputation reporting module 452 communicates with the event detection module 370 and reporting module 360 on a client 150 to provide 520 the reputation score associated with the software application responsive to an attempt to install the software application on the client 150.

Figure 6:
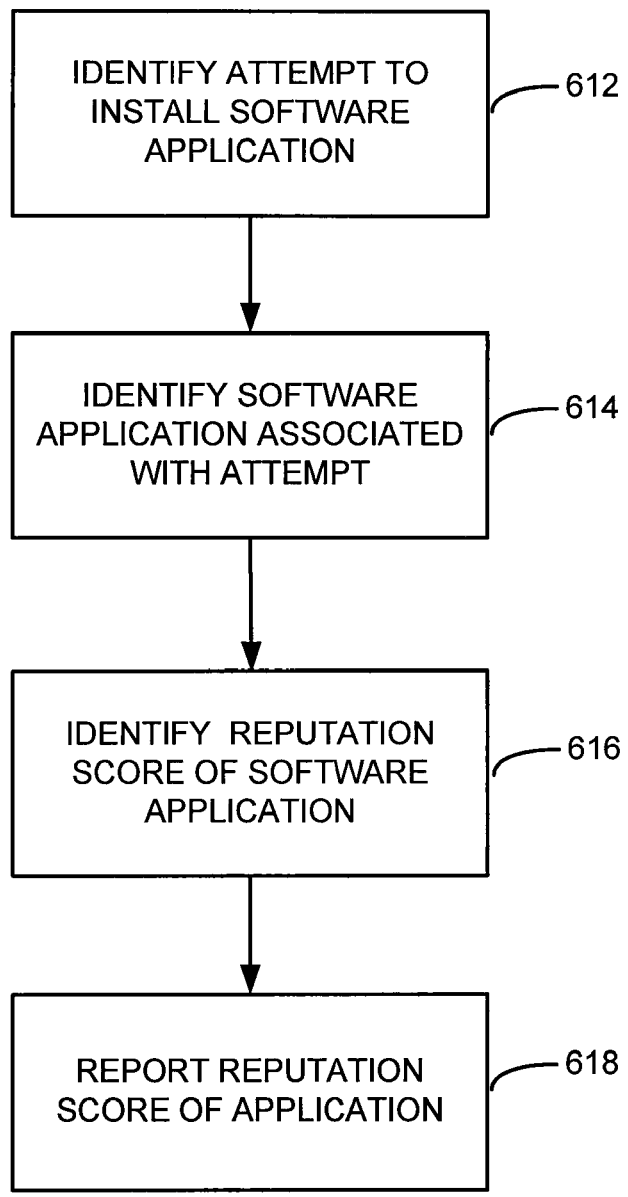
FIG. 6 is a flowchart illustrating steps performed by a reputation score engine 174 to report reputation scores to a client according to one embodiment.

FIG. 6 is a flowchart illustrating steps performed by the reputation score engine 174 to provide a reputation score for a software application to a client 150 according to one embodiment. Those of skill in the art will recognize that embodiments of the reputation score engine 174 simultaneously communicate with multiple clients 150 and provide reputation scores for multiple software applications. Therefore, embodiments of the reputation score engine 174 may perform multiple instances of the steps of FIG. 6 simultaneously. Moreover, some or all of the steps can be performed by engines or modules other than the reputation score engine 174.

The reputation reporting module 452 communicates with the event detection module 370 on the client to identify 612 an attempt to install a software application. The reputation reporting module 452 communicates with the event detection module 370 to identify 614 the software application associated with the installation attempt. The reputation reporting module 452 identifies 616 a reputation score stored in association with the software application in the reputation score database 401. The reputation reporting module 452 communicates with the reporting module 360 to report 618 the identified reputation score for the software application to the user.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of generating a reputation score for a software application, comprising:
   receiving performance data from a plurality of clients, wherein the performance data describes performance of the clients client;
   determining differences in the performance data received from the plurality of clients, wherein a difference in the performance data represents a difference in performance data before the software application was installed on a client and performance data after the software application was un-installed on the client;
   receiving installation events associated with the software application from the plurality of clients;
   determining a rate at which the software application was uninstalled on the plurality of clients responsive to the installation events;
   determining a duration of time between when the software application was installed and when the software application was uninstalled on the plurality of clients responsive to the installation events;
   generating the reputation score for the software application based on the differences in the performance data received from the plurality of clients, the rate at which the software application was uninstalled on the plurality of clients, and the duration of time between when the software application was installed and when the software application was uninstalled on the plurality of clients; and
   storing the reputation score in association with the software application.

2. The method of claim 1, further comprising:
   receiving system data describing one or more hardware components associated with the plurality of clients; and
   wherein generating the reputation score comprises:
      normalizing the differences in the performance data received from the plurality of clients based on the system data associated with the plurality of clients; and
      generating the reputation score for the software application based on the normalized differences in the performance data received from the plurality of clients.

3. The method of claim 1, wherein generating the reputation score further comprises:
   determining a confidence value based on the differences in the performance data reported by the plurality of clients, wherein the confidence value describes the reliability of the differences in the performance data reported the plurality of clients; and generating the reputation score based on the confidence value.

4. The method of claim 1, further comprising:
identifying an attempt to install the software application on a second client;
identifying the reputation score stored in association with the software application; and
providing the reputation score stored in association with the software application to the second client.

5. The method of claim 1, wherein the performance data comprises one or more of: a latency metric, a throughput metric, a utilization metric and an availability metric associated with a client of the plurality of clients.

6. A non-transitory computer-readable storage medium encoded with executable computer program code for receiving a reputation score for a software application, the program code comprising program code for:
identifying, at a client, an attempt to install a software application on the client;
transmitting, from the client to a reputation server, data describing the software application; and
receiving, at the client from the reputation server, a reputation score for the software application responsive to the data describing the software application, wherein the reputation score is based on differences in performance data describing performances of a plurality of clients received from the plurality of clients, wherein a difference in the performance data represents a difference in performance data before the software application was installed on a client of the plurality of clients and performance data after the software application was un-installed on the client of the plurality of clients, wherein the reputation score is further based on a rate at which the software application is uninstalled on the plurality of clients and a duration of time between when the software application was installed and when the software application was uninstalled on the plurality of clients.

7. The storage medium of claim 6, further comprising program code for:
displaying the reputation score for the software application on the client.

8. The storage medium of claim 6, further comprising program code for:
blocking the attempt to install the software application responsive to determining that the reputation score is beneath a threshold reputation score.

9. The storage medium of claim 6, further comprising program code for:
monitoring, at the client, performance data for the client, wherein the performance data describes the performance of the client; and
transmitting, from the client to the reputation server, the performance data for the client.

10. The storage medium of claim 9, further comprising program code for:
identifying, at the client, system data describing one or more hardware components of the client; and
transmitting, from the client to the reputation server, the system data for the client.

11. The storage medium of claim 6, further comprising program code for:
monitoring, at the client, data indicating a set of software applications installed on the client; and transmitting, from the client to the reputation server, the data indicating the set of software applications installed on the client.

12. A computer system for generating a reputation score for a software application, comprising:
a non-transitory computer-readable storage medium encoded with executable computer program code, the program code comprising program code for:
receiving performance data from a plurality of clients, wherein the performance data describes performance of the clients;
determining differences in the performance data received from the plurality of clients, wherein a difference in the performance data represents a difference in performance data before the software application was installed on a client and performance data after the software application was un-installed on the client;
receiving installation events associated with the software application from the plurality of clients;
determining a rate at which the software application was uninstalled on the plurality of clients responsive to the installation events;
determining a duration of time between when the software application was installed and when the software application was uninstalled on the plurality of clients responsive to the installation events;
generating the reputation score for the software application based on the differences in the performance data received from the plurality of clients, the rate at which the software application was uninstalled on the plurality of clients, and the duration of time between when the software application was installed and when the software application was uninstalled on the plurality of clients; and
storing the reputation score in association with the software application; and
a processor for executing the program code.

13. The system of claim 12, where the program code further comprises code for:
receiving system data describing one or more hardware components associated with the plurality of clients; and
wherein generating the reputation score comprises:
normalizing the differences in the performance data received from the plurality of clients based on the system data associated with the plurality of clients; and
generating the reputation score for the software application based on the normalized differences in the performance data received from the plurality of clients.

14. The system of claim 12, wherein generating the reputation score further comprises:
determining a confidence value based on the differences in the performance data reported by the plurality of clients, wherein the confidence value describes the reliability of the differences in the performance data reported the plurality of clients; and
generating the reputation score based on the confidence value.

15. The system of claim 12, wherein the program code further comprises code for:
identifying an attempt to install the software application on a second client;
identifying the reputation score stored in association with the software application; and
providing the reputation score stored in association with the software application to the second client.

16. The system of claim 12, wherein the performance data comprises one or more of: a latency metric, a throughput metric, a utilization metric and an availability metric associated with a client of the plurality of clients.

\* \* \* \* \*

UNITED STATES PATENT AND TRADEMARK OFFICE
CERTIFICATE OF CORRECTION

| | | |
|---|---|---|
| PATENT NO. | : 8,499,063 B1 | Page 1 of 1 |
| APPLICATION NO. | : 12/059258 | |
| DATED | : July 30, 2013 | |
| INVENTOR(S) | : Sourabh Satish et al. | |

It is certified that error appears in the above-identified patent and that said Letters Patent is hereby corrected as shown below:

In the Claims

Column 10, line 27, after "the clients" delete "client".

Signed and Sealed this
Eleventh Day of February, 2014

Michelle K. Lee
*Deputy Director of the United States Patent and Trademark Office*